United States Patent

[11] 3,593,189

| | | |
|---|---|---|
| [72] | Inventor | Carl F. Buhrer<br>Oyster Bay, N.Y. |
| [21] | Appl. No. | 802,874 |
| [22] | Filed | Feb. 27, 1969 |
| [45] | Patented | July 13, 1971 |
| [73] | Assignee | General Telephone & Electronics<br>Laboratories Incorporated |

[54] FREQUENCY STABILIZATION SYSTEM
11 Claims, 3 Drawing Figs.

| | | |
|---|---|---|
| [52] | U.S. Cl. | 331/94.5 |
| [51] | Int. Cl. | H01s 3/02 |
| [50] | Field of Search | 331/94.5;<br>350/160; 250/199 |

[56] References Cited
UNITED STATES PATENTS

| | | | |
|---|---|---|---|
| 3,361,990 | 1/1968 | Gordon et al. | 331/74.5 |

*Primary Examiner*—William L. Sikes
*Attorney*—Robert J. Frank

ABSTRACT: A system for stabilizing the output frequency of a laser that uses as a reference absorber a material which is different from the active medium of the laser being stabilized. The system employs a frequency shifter for shifting the output frequency of the laser to a specified frequency within the absorption spectrum of the reference absorber material.

$\omega_O$ = FREQUENCY STANDARD
$\omega_L$ = ACTUAL LASER FREQUENY
$\omega_A$ = ABSORPTION PEAK FREQUENCY
$\omega_S$ = SHIFTING FREQUENCY
$\omega_M$ = MODULATING FREQUENCY INVENTOR.
CARL F. BUHRER
BY R. J. Frank
ATTORNEY

FREQUENCY STABILIZATION SYSTEM

BACKGROUND OF THE INVENTION

This invention relates to frequency stabilization systems and, more particularly, to an apparatus for stabilizing the output frequency of a laser.

The word "laser" is an acronym standing for "light amplification by stimulated emission of radiation." A laser produces a beam of coherent electromagnetic energy at a frequency in that range of the spectrum broadly described as optical. This range includes the regions known as the near ultraviolet, the visible, and the infrared. A laser typically comprises an optical cavity resonator having spaced-apart parallel reflective ends in which is contained an appropriate active medium, which may be a solid, a liquid, or a gas.

The active medium consists of atoms or molecules which are capable of emitting a photon of energy $\eta f_o$ (where $\eta$ is Planck's constant and $f_o$ is a given frequency) when impinged upon by another photon having the same energy. This effect, known as "stimulated emission" can occur, however, only after a given atom or molecule has been excited to a specific energy state above its normal or ground state.

To produce laser action it is necessary to have a certain minimum proportion of the medium atoms or molecules in this excited state at a given time, a condition known as "population inversion." The energy required to maintain population inversion is supplied to the laser medium by "pumping." Many different methods of pumping are known with the type of pumping used normally determined by the particular laser medium employed. For example, in a gas laser, pumping may be accomplished by electrical excitation, whereas in a laser having a solid active medium an intense light source pump is generally used. The phenomenon of stimulated emission and lasers in general are described in an article in the Mar. 1963 edition of *American Scientist* titled "Lasers" by A. K. Levine.

The output beam produced by a laser is highly monochromatic; that is, it consists of a small, well-defined range of frequencies. This frequency range is dependent upon the natural emission frequencies of the active laser medium and also, quite importantly, on the geometrical dimensions of the cavity resonator. A laser cavity resonator, like a microwave cavity resonator, has multiple resonance modes with corresponding multiple resonant frequencies. Unlike microwave resonators, however, the dimensions of a laser resonator are of the order of several thousand times as large as the wavelengths generated by the laser. A laser resonator is therefore capable of supporting a plurality of modes at distinct but closely spaced optical frequencies, with mode structure strongly dependent upon the resonator dimensions. This being the case, it can be readily appreciated that the output of a laser is subject to frequency variations resulting from environmental changes which cause even the tiniest mechanical fluctuations of the laser resonator cavity.

One of the research undertakings in the laser field has been to develop a laser having an output frequency which is extremely stable. Such a laser could be used, for example, as a frequency standard or to provide a highly accurate standard of length based on optical wavelengths. Furthermore, the ultimate usefulness of the laser as a communications device will be influenced by the degree of frequency stability which can be obtained. It is generally known that gas lasers are extraordinarily monochromatic and, therefore, much of the effort towards obtaining an extremely stable laser output frequency has been centered around the gas laser. Early attempts at achieving frequency stability of gas lasers were directed primarily at environmental stabilization of the laser cavity to prevent mechanical fluctuations caused by thermal changes, acoustic vibration, aging of materials and the like. This technique, while valuable, is limited to use by laboratories having the precision equipment necessary for delicate environmental isolation of the laser cavity. Furthermore, design considerations for achieving a high degree of frequency stability in this manner may necessarily degrade other laser parameters such as output power or efficiency.

The development of automatic feedback control systems for frequency stabilization of lasers has overcome some of the above-mentioned problems. In these systems, an error signal or discriminant which is a measure of deviations of the laser output from a given standard frequency is used to adjust the frequency of the laser. A review of some of the laser frequency stabilization techniques which have been developed can be found in an article entitled "Frequency Stabilization of Gas Lasers" by A. D. White, which appeared in the *IEEE Journal of Quantum Electronics*, Nov. 1965 issue.

A recent feedback scheme for stabilizing the output frequency of a laser was set forth by A. E. Siegman in an article in the July 1967 edition of the *IEEE Journal of Quantum Electronics* entitled "Absolute Frequency Stabilization of a Laser Oscillator Against a Laser Amplifier." The Siegman article discloses a system for stabilizing a gas laser which functions in the following manner: Assume that the laser to be frequency stabilized (the primary laser) is producing an output at a frequency $\omega_L$. A portion of this output is frequency modulated at some convenient modulation frequency $\omega_m$, thereby producing a signal having FM sidebands at the frequencies ($\omega_L + \omega_m$), the upper sideband, and ($\omega_L - \omega_m$), the lower sideband. The frequency modulated signal is passed through a reference laser amplifier having a center frequency $\omega_a$ which corresponds to the frequency at which the primary laser is to stabilized. If the laser output frequency $\omega_L$ coincides with the stabilization frequency $\omega_a$, the upper and lower sidebands of the frequency modulated signal receive balanced amplification and no fundamental-frequency FM to AM conversion occurs in the amplifier. When $\omega_L$ deviates from $\omega_a$, however, the FM sidebands receive unbalanced amplification and the amplifier's output will contain an AM component at the modulation frequency $\omega_m$. This AM component will have an amplitude which varies substantially linearly with the frequency deviation ($\omega_L - \omega_a$) over a certain range around the reference frequency $\omega_a$. The AM component can thus be used as a discriminant which is a measure of drift in the laser output frequency. The discriminant is applied to a feedback control circuit which adjusts the frequency of the laser.

This stabilization system offers an advantage attributable to the use of a separate reference laser amplifier as a frequency standard. The operating conditions of the reference laser amplifier can be adjusted for optimum long term frequency stability and reproducibility, while the same operating parameters of the primary laser can be adjusted for optimum output power, efficiency, or other considerations which are independent of frequency stability considerations.

The use of a separate reference amplifier is not without its disadvantages however, The laser reference amplifier consists of a vessel containing a material which is the same as the primary laser active medium. This material may be, for example, a mixture of helium and neon. In the He-Ne laser, the laser action is due to a photon emission (or energy transition) of the Ne atoms. The purpose of the helium in the mixture is to transfer pumping energy to the Ne atoms. The neon atoms in the reference amplifier are pumped to an excited state in the same manner as those in the primary laser. When the primary laser beam is passed through the reference amplifier, neon atoms in the excited state are impinged upon by photons from the primary laser beam and stimulated to emit additional photons, thereby increasing (or amplifying) the photon flux. It is important to note that the reference amplifier medium must be pumped to an excited state before photon amplification can occur. For a gas mixture such as He-Ne, the pumping is accomplished by electric excitation which causes a gas discharge. When the relatively light neon atoms are subjected to the relatively high temperatures associated with the discharge, a considerable Doppler broadening of the neon transition linewidth occurs. In other words, the gain-versus-frequency curve of the neon-containing reference laser amplifier is broadened due to the velocity of the neon atoms. This phenomenon limits the frequency error discriminating capability of the system.

The Doppler broadening problem in the above-referenced system is characteristic of gas laser stabilization systems which use an energy transition of the laser medium as an external frequency reference. There are two basic reasons for this. First of all, the gas laser medium is often composed of relatively light atoms or molecules. Secondly, the pumping energy imparted to the gas causes increased motion of the gas atoms or molecules. It should be noted that the need for pumping is not eliminated in systems which employ the laser active medium as a reference absorber (rather than as an amplifier), since the medium cannot absorb photons from the primary laser when in the ground state and must first be pumped to a specific energy state above the ground state. A system which uses a reference absorber is disclosed by A. D. White, E. I. Gordon and E. F. Labuda in an article entitled "Frequency Stabilization of Single Mode Gas Lasers" which appeared in the Sept. 1964 edition of *Applied Physics Letters*.

SUMMARY OF THE INVENTION

The present invention comprises a system for stabilizing the output frequency of a laser that uses as a reference absorber a material which is different from the active medium of the laser being stabilized. The reference absorber medium is chosen to consist of relatively heavy atoms or molecules which absorb the primary laser radiation from an unpumped or ground state. These relatively heavy atoms or molecules in an unexcited state have an absorption spectrum which is relatively free of undesirable Doppler broadening. Thus, the frequency discriminating capability of the present invention is less subject to Doppler broadening limitations than systems which employ the laser active medium as a reference.

According to the present invention apparatus is provided for obtaining a discriminant which is a measure of the difference between the frequency of the output of a laser and a chosen frequency standard $\omega_o$. A portion of the output of the laser is passed through a signal processing means which includes, in a series arrangement, a frequency shifter and a modulator. The frequency shifter shifts the frequency of the laser output portion by a predetermined shifting frequency $\omega_s$. The modulator modulates the frequency of the laser output portion with a modulating signal having a predetermined modulating frequency. The output of the signal processing means can thus be expressed as a carrier signal at a frequency equal to the shifted laser output frequency plus upper and lower FM sideband signals equally spaced about the carrier. The output of the signal processing means is passed through an absorbing medium having an absorption profile with a peak value at a given reference frequency $\omega_a$. This reference frequency is substantially equal to the sum of the frequency standard $\omega_o$ and the shifting frequency $\omega s$. If the output frequency of the laser is equal to the frequency standard, the carrier signal will correspond in frequency to the reference frequency. In this case, the upper and lower sideband signals will be attenuated equally and the output of the absorbing medium will not contain a component of amplitude modulation. If, however, the output frequency of the laser deviates from the frequency standard, the two sidebands will be attenuated by different amounts and the output of the absorbing medium will contain a component of amplitude modulation. The phase of the amplitude modulated output of the absorbing medium is compared with that of the modulating signal to determine the direction of drift.

Further objects and features of the invention will be more fully and clearly understood from the following description taken in conjunction with the accompanying drawings.

DESCRIPTION OF THE PREFERRED EMBODIMENT

Figure 1:
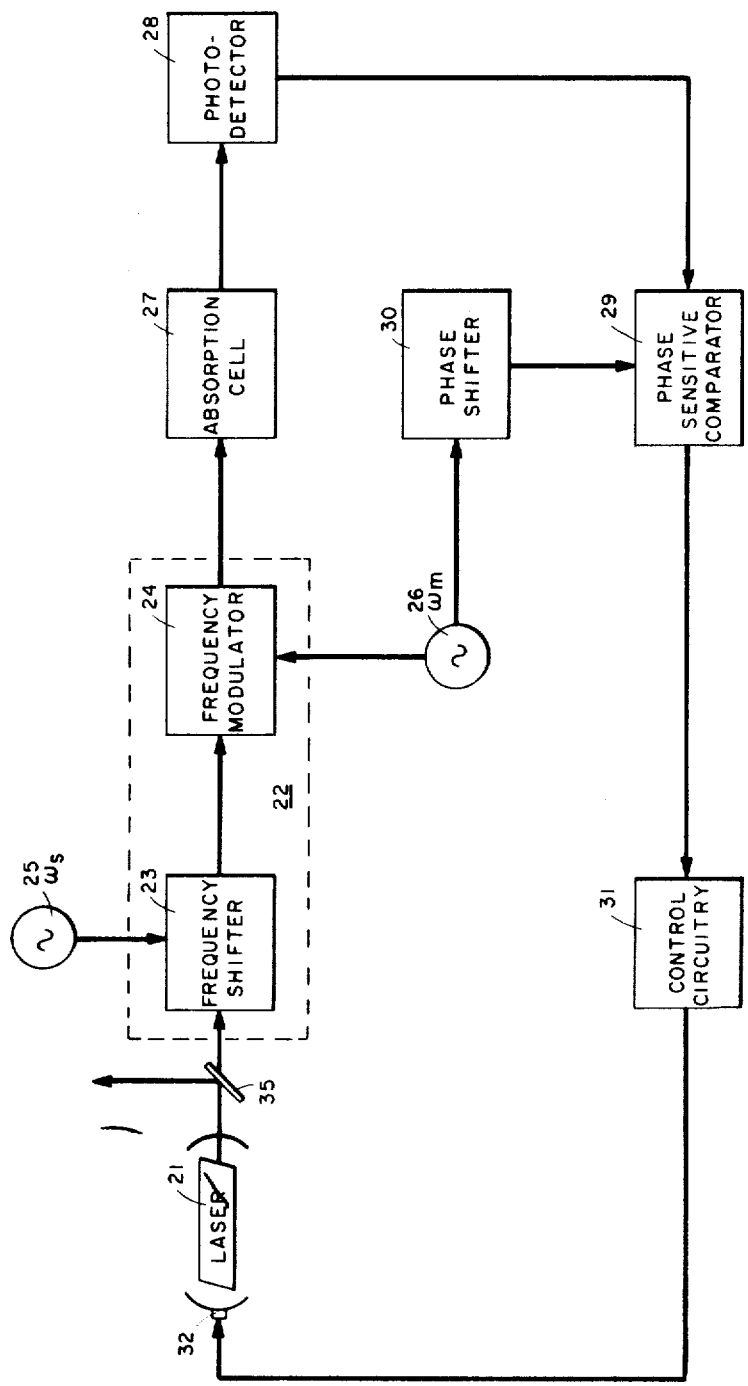
FIG. 1 is an embodiment of a frequency stabilization system in accordance with the invention.

Referring now to FIG. 1 there is shown in accordance with the invention an apparatus for stabilizing the output frequency of laser 21 at some predetermined frequency standard $\omega_o$. Laser 21 is typically a gas laser such as the helium-neon laser described in the above-mentioned Levine article. The output beam of laser 21 is passed through beam splitting means 35, such as a partially transmissive mirror, and a portion of said output beam is then passed through signal processing means depicted by the dash-enclosed area 22. Signal processing means 22 includes, in a series arrangement, frequency shifter 23 and frequency modulator 24. Frequency shifter 23 shifts the frequency of the laser beam by a predetermined amount $\omega_s$ using a signal from power source 25. Frequency modulator 24 modulates the laser beam at a frequency $\omega_m$ with a modulating signal derived from source 26. The frequency shifter 23 may be, for example, a single sideband suppressed-carrier light modulator such as that disclosed in my U.S. Pat. No. 3,239,671 issued Mar. 8, 1966 and assigned to the same assignee as the present invention. The mode of operation of this single-sideband modulator with full suppression of carrier and second order sidebands (the mode of interest here) is described in detail in my article entitled "Single Sideband Microwave Light Modulation" which appeared in Vol. 52, No. 8 Aug. 1964) of the *Proceedings of the IEEE*. The frequency modulator may be, for example, one which employs electro-optic crystals such as the modulator disclosed in an article entitled "Gigacycle Bandwidth Coherent Light Travelling-Wave Phase Modulator" by C. J. Peters which appeared in Vol. 51 at page 147 of the *Proceedings of the IEEE* (1953).

The output of signal processing means 22 can be expressed as the sum of a carrier signal, an upper sideband signal, and a lower sideband signal. If the laser 21 is operating at an output frequency $\omega_L$, the carrier will have a frequency $(\omega_L+\omega_s)$ and the upper and lower sidebands will be at the frequencies $(\omega_L+\omega_s+\omega_m)$ and $(\omega_L+\omega_s-\omega_m)$, respectively. The output of means 22 is passed through an absorption cell 27 which contains an absorption medium having an absorption profile with a peak value at a reference frequency $\omega_a$, where $\omega_a$ is equal to the sum of the frequency standard $\omega_o$ and the shifting frequency $\omega s$, $\omega_a=\omega_o+\omega_s$. It should be noted that $\omega_s$ can take negative as well as positive values representing shifts to lower as well as to higher frequencies.

Figure 2:
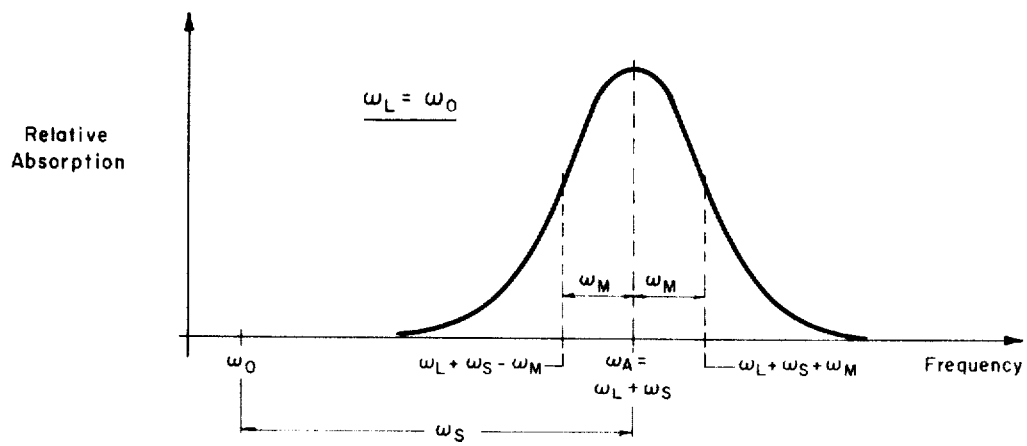
FIGS. 2 and 3 are explanatory graphs of the absorption spectrum of an absorption medium.
Figure 3:
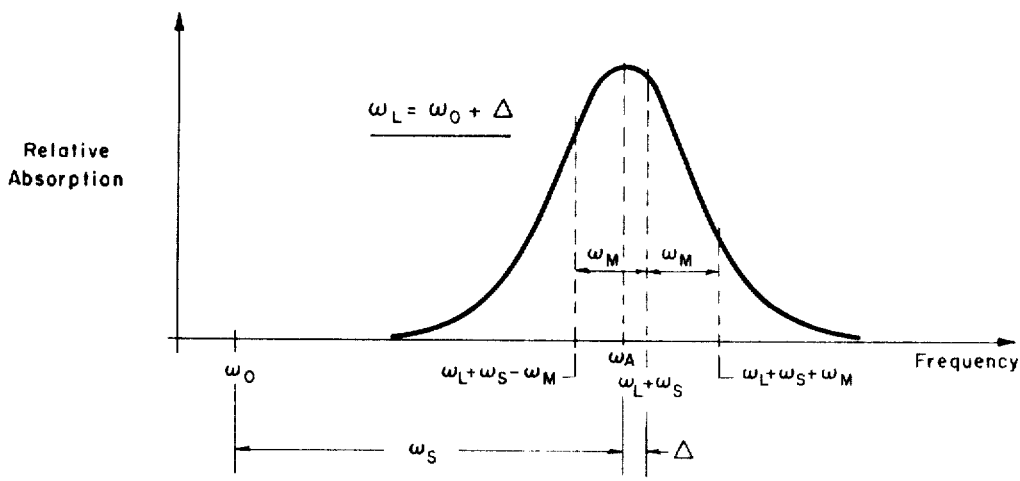

FIGS. 2 and 3 are graphs of relative absorption versus frequency for the absorption cell 27 which illustrate the operation of cell 27 for specific examples of laser output frequency. In FIG. 2 the actual laser output frequency $\omega_L$ is assumed equal to the frequency standard $\omega_o$. It is seen that the shifted carrier frequency $(\omega_L+\omega_s)$ is equal to the reference frequency $\omega_a$ and the absorption of the upper and lower sidebands is balanced. In this case the output of cell 27 will contain no component of amplitude modulation since the sidebands are attenuated by equal amounts. In FIG. 3 it is assumed that the laser output frequency $\omega_L$ has drifted above the frequency standard $\omega_o$ by an amount $\Delta$. It follows that the shifted carrier frequency $(\omega_L+\omega_s)$ will be greater than the reference frequency $\omega_a$ by an amount equal to $\Delta$ as shown in the figure. In this case it is seen that the lower sideband will be absorbed to a greater extent than the upper sideband with the difference in absorption being a function of the frequency drift $\Delta$. Therefore the output of absorption cell 27 will contain a component of amplitude modulation at a frequency $\omega_m$ that is a measure of the amount the laser output frequency has deviated from frequency standard $\omega_o$.

Referring again to FIG. 1, the unabsorbed beam output of cell 27 is sensed by detection means such as photodetector 28. The output of photodetector 28 is an amplitude modulated electrical signal having a level of amplitude modulation which is a function of the amount of the laser output frequency deviation. Phase-sensitive comparator 29 is used to determine the direction of frequency deviation; that is, whether the actual laser output frequency $\omega_L$ is higher or lower than the frequency standard $\omega_o$. Phase-sensitive comparator 29 may be, for example, a homodyne detector or a synchronous demodulator. Comparator 29 measures the phase of the output of photodetector 28 using as a reference the modulating signal from source 26. The phase reverses for deviations in opposite directions. Phase shifter 30 is used to cancel the effect of undesired phase shifts during absorption and photodetection.

The output of comparator 29 is a discriminant which is a measure of the amount and direction that the output of the laser 21 has drifted from a predetermined frequency standard. This discriminant is fed to control circuitry 31 which tunes the laser 21, such as by changing the mirror spacing with a piezoelectric transducer 32. Other known techniques for tuning a laser may be used, such as changing the index of refraction of part of the medium between the mirrors by gas density modulation or electro-optic modulation.

As stated above, the absorbing medium in cell 27 is chosen to consist of relatively heavy atoms or molecules which preferably absorb the (shifted) laser radiation from the ground state. The relative absence of Doppler broadening in such medium and the resultant narrow absorption spectrum gives rise to a level of frequency discriminating capability not attainable with a Doppler broadening absorber. For example, in FIG. 3 it is seen that the difference in relative absorption between the upper and lower sidebands for a given $\Delta$ will depend upon the slope of the absorption curve. It is thus clear that a narrow absorber with a corresponding steeper slope will give better frequency discriminating capability than a broad absorber.

An absorber material found suitable for the present invention is iodine vapor. Iodine has a is, of absorption frequencies in the visible region of the spectrum and a relatively high molecular weight of 254. Iodine also is monoisotopic and has a convenient vapor pressure at room temperature. It appears that iodine has an absorption band peak located at about 3 gigaHertz from the helium-neon laser frequency of wavelength 6328 A. Thus for this particular laser and absorber an original shifting frequency $w_s$ of about 3 gigaHertz is chosen with the ultimate shifting frequency being determined by tuning the system after setup. The frequency standard $\omega_o$ is, of course, chosen to lie near the emission peak of the laser active medium. The choice of modulating frequency $\omega_m$ is determined by the shape of the absorption spectrum and should be chosen such that the shifted upper and lower sidebands occur at steep portions of the absorption spectrum. For an iodine absorbing medium a modulating frequency in the range 100 to 1000 megahertz can be used.

While the invention has been described in connection with specific embodiments, other modifications thereof will be readily apparent to those skilled in the art without departing from the spirit and scope of the invention. For example, the frequency modulator can be located before the frequency shifter if desired.

What I claim is:

1. Apparatus for obtaining a discriminant which is a measure of the difference between the frequency of the output of a laser and a frequency standard $\omega_o$ comprising:
   a. signal processing means for processing a portion of the laser output, said signal processing means including in series a frequency shifter for shifting the frequency of said portion of the laser output by a predetermined shifting frequency $\omega_s$ and a modulator for frequency modulating said portion of the laser output with a modulating signal;
   b. an absorbing medium for partially absorbing the output of said signal processing means, said absorbing medium having an absorption profile with a peak value at a frequency $\omega_n$, where $\omega_a$ is substantially equal to the sum $(\omega_o + \omega_s)$;
   c. means for detecting the amplitude of the unabsorbed output of said absorbed output of said absorbing medium; and
   d. means for comparing the output of said detecting means with said modulating signal 2. The apparatus as defined by claim 1 wherein said predetermined frequency standard $\omega_o$ is within the emission frequency band of the active medium of said laser.

3. The apparatus as defined by claim 2 further comprising a phase shifter for shifting the phase of said modulating signal before comparing it with the output of said detecting means.

4. The apparatus as defined by claim 2 wherein said absorbing medium contains iodine vapor.

5. The apparatus as defined by claim 4 wherein the active medium of said laser contains a mixture of neon and helium.

6. Apparatus for stabilizing the output frequency of a laser at a predetermined frequency $\omega_o$ lying within the emission frequency band of the laser active medium comprising:
   a. signal processing means for processing a portion of the laser output, said signal processing means including in series a frequency shifter for shifting the frequency of said portion of the laser output by a predetermined shifting frequency $\omega_s$ and a modulator for frequency modulating said portion of the laser output with a modulating signal;
   b. an absorbing medium for partially absorbing the output of said signal processing means, said absorbing medium having an absorption profile with a peak value at a frequency $\omega_a$, where $\omega_a$ is substantially equal to the sum $(\omega_o + \omega_s)$;
   c. means for detecting the amplitude of the unabsorbed output of said absorbing medium;
   d. means for generating a discriminant by comparing the output of said detecting means with said modulating signal; and
   e. means for varying the output frequency of said laser in accordance with said discriminant.

7. The apparatus as defined by claim 6 wherein said absorbing medium contains iodine vapor.

8. The apparatus as defined by claim 7 wherein the active medium of said laser contains a mixture of neon and helium.

9. Apparatus for stabilizing the output frequency of a laser at a predetermined frequency $\omega_o$ lying within the emission frequency band of the laser active medium comprising:
   a. means for splitting the output beam of said laser into first and second portions;
   b. signal processing means for processing said first portion of the laser output, said signal processing means including in series a frequency shifter for shifting the frequency of said first portion of the laser output by a predetermined shifting frequency $\omega_s$ and a modulator for modulating said portion of the laser output with a modulating signal;
   c. an absorbing medium for partially absorbing the output of said signal processing means, said absorbing medium having an absorption profile with a peak value at a frequency $\omega_n$, where $\omega_a$ is substantially equal to the sum $(\omega_o + \omega_s)$;
   d. a photodetector for detecting the unabsorbed output of said modulating signal;
   e. a phase shifter for shifting the phase of said modulating signal;
   f. a comparator coupled to the output of said phase shifter and the output of said photodetector; and
   g. means for varying the output frequency of said laser in accordance with the output of said comparator.

10. The apparatus as defined by claim 9 wherein said absorbing medium contains iodine vapor.

11. The apparatus as defined by claim 10 wherein the active medium of said laser contains a mixture of neon and helium.